(12) United States Patent
Kano et al.

(10) Patent No.: US 9,034,502 B2
(45) Date of Patent: May 19, 2015

(54) BATTERY INSTALLATION STRUCTURE FOR ELECTRIC VEHICLES

(75) Inventors: Hiroaki Kano, Okazaki (JP); Takao Yoshikawa, Okazaki (JP); Takashi Nogami, Toyota (JP); Katsuhiro Suzuki, Anjo (JP); Tomoya Nishita, Okazaki (JP); Ken Muguruma, Okazaki (JP); Seiichi Takasaki, Okazaki (JP); Hideki Honio, Okazaki (JP); Ko Asai, Toyokawa (JP); Takanori Yamamoto, Toyota (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi (JP)

( * ) Notice: Subject to any disclaimer, the term of this patent is extended or adjusted under 35 U.S.C. 154(b) by 361 days.

(21) Appl. No.: 13/406,966

(22) Filed: Feb. 28, 2012

(65) Prior Publication Data
US 2012/0251862 A1    Oct. 4, 2012

(30) Foreign Application Priority Data

Mar. 31, 2011    (JP) .................................. 2011-079048

(51) Int. Cl.
*H01M 2/10*    (2006.01)
*B62D 21/15*   (2006.01)
(Continued)

(52) U.S. Cl.
CPC ........... *B62D 21/157* (2013.01); *H01M 2/1077* (2013.01); *H01M 2/10* (2013.01);
(Continued)

(58) Field of Classification Search
CPC . H01M 2/1077; H01M 2/1083; H01M 2/347; H01M 2/10; B60L 11/111; B60L 11/1877; B60L 3/0007; B60L 11/1879; B62D 21/157; B60Y 2306/01

USPC ............................................................ 429/99
See application file for complete search history.

(56) References Cited

U.S. PATENT DOCUMENTS

| 6,227,322 B1 * | 5/2001 | Nishikawa ................... 180/68.5 |
| 2008/0160394 A1 | 7/2008 | Takasaki et al. |

(Continued)

FOREIGN PATENT DOCUMENTS

| DE | 10 2009 053 138 A1 | 5/2011 |
| EP | 2 072 308 A2 | 6/2009 |

(Continued)

OTHER PUBLICATIONS

Machine Translation of JP 2010-163039.*
European Seach Report dated May 10, 2012.

*Primary Examiner* — Jonathan Jelsma
(74) *Attorney, Agent, or Firm* — Birch, Stewart, Kolasch & Birch, LLP (57) ABSTRACT

A battery tray is fixed onto a front battery cross member lower and a rear battery cross member lower. The battery pack is mounted on the battery tray. The front battery cross member lower and the rear battery cross member lower come into contact with a deformable zone of the battery tray and the end face of each of battery cross member uppers at attachment portions. Space is created between the battery pack and the battery cross member uppers. The battery cross member uppers are welded so that a deformable zone having relatively low rigidity is formed. In this way, the front battery cross member lower and the rear battery cross member lower are fixed to a pair of side members through the battery cross member uppers.

3 Claims, 6 Drawing Sheets

(51) Int. Cl.
  *B60K 1/04* (2006.01)
  *B60L 3/00* (2006.01)
  *B60L 11/18* (2006.01)
  *H01M 2/34* (2006.01)

(52) U.S. Cl.
  CPC ............... *B60K 1/04* (2013.01); *B60L 3/0007* (2013.01); *B60L 11/1803* (2013.01); *B60L 11/1877* (2013.01); *B60L 11/1879* (2013.01); *H01M 2/1083* (2013.01); *H01M 2/347* (2013.01); *H01M 2220/20* (2013.01); *Y02T 10/7005* (2013.01); *Y02T 10/705* (2013.01); *B60Y 2306/01* (2013.01)

(56) References Cited

U.S. PATENT DOCUMENTS

2009/0021052 A1    1/2009  Kato
2010/0307848 A1*  12/2010  Hashimoto et al. .......... 180/68.5

FOREIGN PATENT DOCUMENTS

| JP | 2008-162497 A | 7/2008 |
| JP | 2008-174181 A | 7/2008 |
| JP | 2010-163039 A | 7/2010 |
| WO | 2010/073809 A1 | 7/2010 |

* cited by examiner

BATTERY INSTALLATION STRUCTURE FOR ELECTRIC VEHICLES

BACKGROUND OF THE INVENTION

1. Field of the Invention

The invention relates to a battery installation structure for electric vehicles, and more specifically, to a structure that prevents damages to the battery in the event of a side impact crash.

2. Description of the Related Art

According to conventional battery installation structures for electric vehicles, to prevent damages to a battery pack in the event of a collision against a vehicle, a battery case containing battery cells is fixed with bolts to a battery cross member having a closed section, and the battery cross member is also fixed with bolts to a pair of side members so that the battery pack is positioned between the side members fixed to the sides of the vehicle and extending in the vehicle's anteroposterior direction (Japanese Unexamined Patent Publication (Kokai) No. 2008-162497).

In the battery installation structure for electric vehicles which is disclosed in the above publication, since the battery case is fixed with bolts to the battery cross member having a closed section, for example, if the vehicle is hit by another vehicle or the like in the side at high speed, the structure fails to absorb the load produced by the collision. This leads to an unfavorable condition in which the battery cross member is moved towards the center of the vehicle and damages the battery pack, or even battery cells in the battery case, and electrical safety is degraded.

SUMMARY OF THE INVENTION

It is an object of the invention to provide a battery installation structure for electric vehicles, which is capable of reducing damages to a battery pack in the event of a side impact crash.

In order to achieve the above object, a battery installation structure for electric vehicles, comprising a battery pack located between a pair of side members fixed to both sides of a vehicle body and extending in an anteroposterior direction of the vehicle body, and a plurality of battery cross members extending in a width direction of the vehicle body and fixing the battery pack to the side members, wherein at least one of the battery cross members have deformable zones between the battery pack and the respective side members.

Because of the deformable zones located between the battery pack and the respective side members, the battery cross members are deformable in the deformable zones when being applied with load in a side impact crash. The deformation prevents the contact between the battery pack and the battery cross members, which is brought about by the battery cross members being moved in the crash, and thus reduces damages to the battery pack caused by the battery cross members.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Embodiments of the invention will be described below with reference to the attached drawings.

Vehicles used in the embodiments are electric vehicles having a motor for moving a vehicle, which is supplied with power from a battery pack and is controlled by an inverter, as a device for moving the vehicles.

Firstly, a battery installation structure for electric vehicles according to a first embodiment of the invention will be described.

[First Embodiment]

Figure 1:
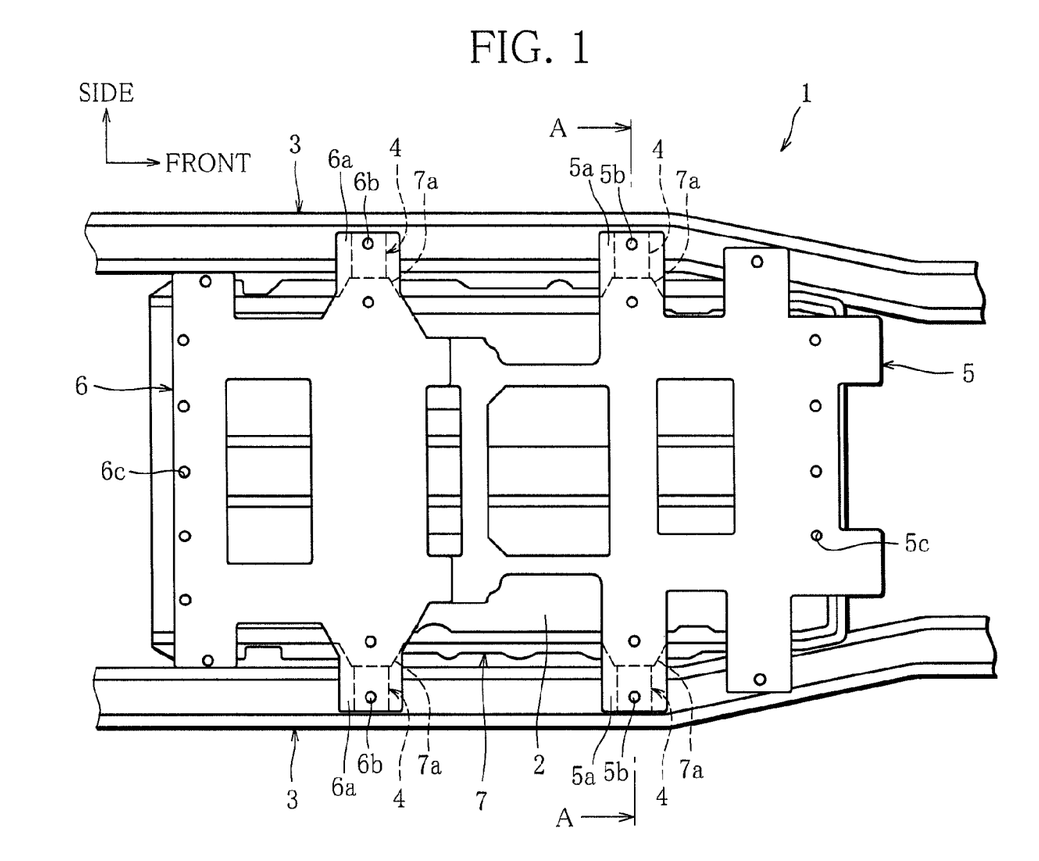
FIG. 1 is a bottom view showing a central part of a vehicle body applied with a battery installation structure for electric vehicles according to a first embodiment of the invention.
Figure 2:
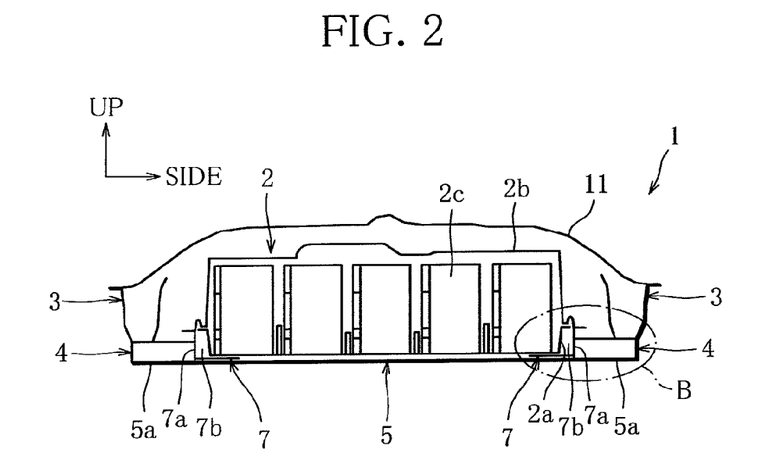
FIG. 2 is a sectional view taken along line A-A of FIG. 1.
Figure 3:
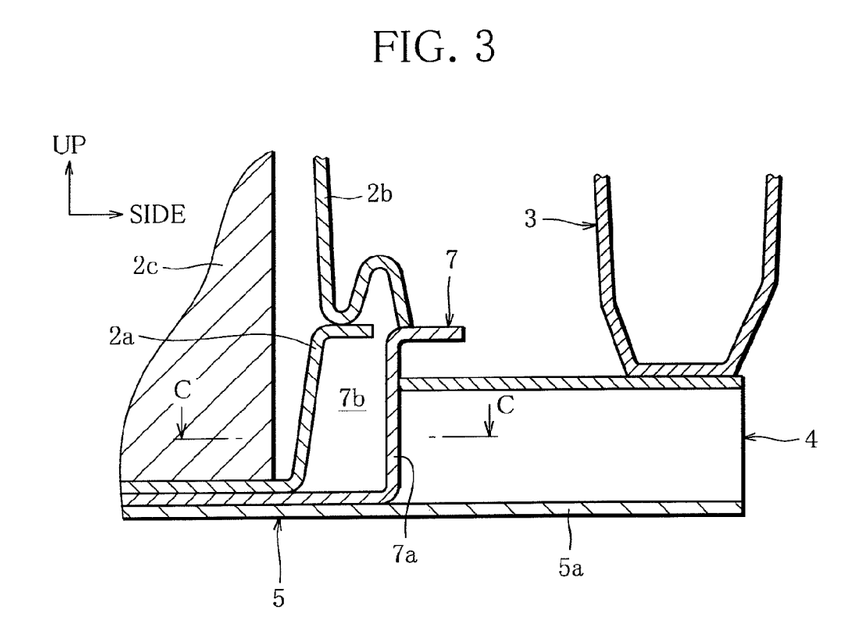
FIG. 3 is an enlarged view of an encircled part B shown in FIG. 2.
Figure 4:
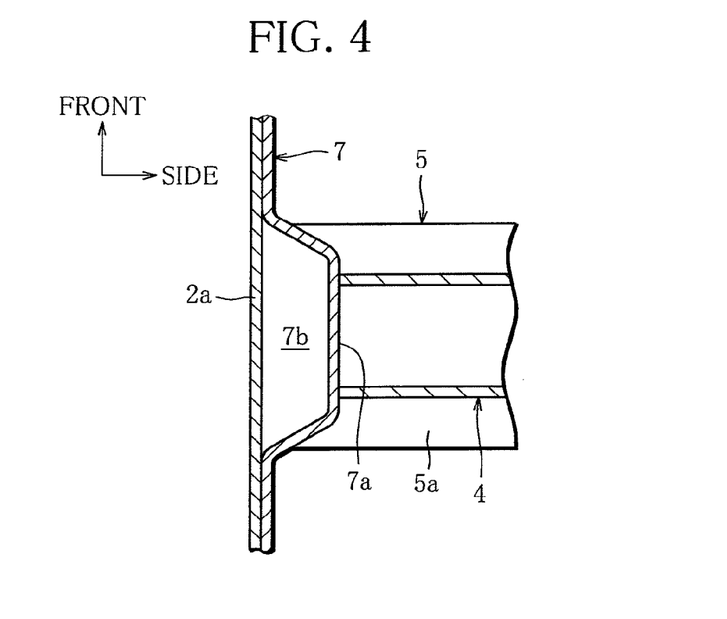
FIG. 4 is a sectional view taken along line C-C of FIG. 3.

FIG. 1 is a bottom view showing a central part of a vehicle body applied with a battery installation structure for electric vehicles according to the first embodiment of the invention. FIG. 2 is a sectional view taken along line A-A of FIG. 1. FIG. 3 is an enlarged view of an encircled part B shown in FIG. 2. FIG. 4 is a sectional view taken along line C-C of FIG. 3. In the drawings, "UP", "FRONT" and "SIDE" arrows represent the upward, forward and width directions, respectively, of the vehicle body.

As illustrated in FIGS. 1 to 4, a vehicle body 1 of the first embodiment is made up of a pair of side members 3 extending in an anteroposterior direction along right and left sides of the vehicle body 1, and a front battery cross member lower 5 and a rear battery cross member lower 6 connected to a pair of side members 3 through battery cross member uppers 4. A battery pack 2 is disposed on the front battery cross member lower 5 and the rear battery cross member lower 6 through a battery tray 7 that positions the battery pack 2 between the side members 3 located under a floor 11 in the center of the vehicle body.

The battery pack 2 is formed by setting a plurality of battery cells 2c in space created by a case 2a and a cover 2b.

The side members 3 are each formed into a bar-like shape having an inverted substantially hat-shaped section.

The battery cross member uppers 4 are each formed into a bar-like shape having an inverted substantially U-shaped section.

The front battery cross member lower 5 is made of a thin metal plate in a shape of a substantial pound sign (crosshatched symbol). Projections of the front battery cross member lower 5, which extend in rightward and leftward directions of the vehicle body, are provided with attachment portions 5a to be connected to the side members 3. In the attachment portions 5a, there are formed bolt holes 5b into which bolts are inserted. In the front battery cross member lower 5, there are formed a plurality of bolt holes 5c for fixing the battery pack 2 with bolts.

The rear battery cross member lower 6 is made of a thin metal plate in a shape of a substantial pound sign (crosshatched symbol) whose pair of projections projecting rearwards are cut off. These rear projections of the front battery cross member lower 5 are connected to front projections of the rear battery cross member lower 6. In this manner, the front battery cross member lower 5 and the rear battery cross member lower 6 support a lower face of the battery pack 2 as a unit. Projections of the rear battery cross member lower 6, which extend in the rightward and leftward directions of the vehicle body, are provided with attachment portions 6a to be connected to the side members 3. In the attachment portions 6a, there are formed bolt holes 6b into which bolts are inserted. In the rear battery cross member lower 6, there are formed a plurality of bolt holes 6c for fixing the battery pack 2 with bolts.

The battery tray 7 is formed in a substantially Z-like shape in section as shown in FIG. 3, and is made up of a thin metal plate expanding along the form of the case 2a of the battery pack 2 in a bottom view. In the battery tray 7, there is formed a deformable portion 7a with which the end of the battery cross member upper 4 comes into contact, and which has relatively low rigidity.

The battery cross member upper 4 is welded to an upper face of the corresponding attachment portion 5a of the front battery cross member lower 5 and an upper face of the corresponding attachment portion 6a of the rear battery cross member lower 6. The end face of the battery cross member upper 4 is welded and fixed to the deformable portion 7a.

The front battery cross member lower 5 and the rear battery cross member lower 6 are fixed to the side members 3 through the battery cross member uppers 4 with bolts, not shown.

The battery pack 2 is mounted on and fixed to the battery tray 7 with bolts, not shown.

According to the first embodiment, the battery tray 7 is formed so as to curve in an outward direction of the vehicle in the deformable portion 7a as mentioned, so that there is space created between a side wall of the case 2a and the deformable portion 7a of the battery tray 7. In the battery tray 7, there is formed a deformable zone 7b between the battery pack 2 and the battery cross member upper 4, which has relatively low rigidity.

The following description is about operation and advantages of the battery installation structure for electric vehicles according to the first embodiment of the invention thus configured.

Figure 5:
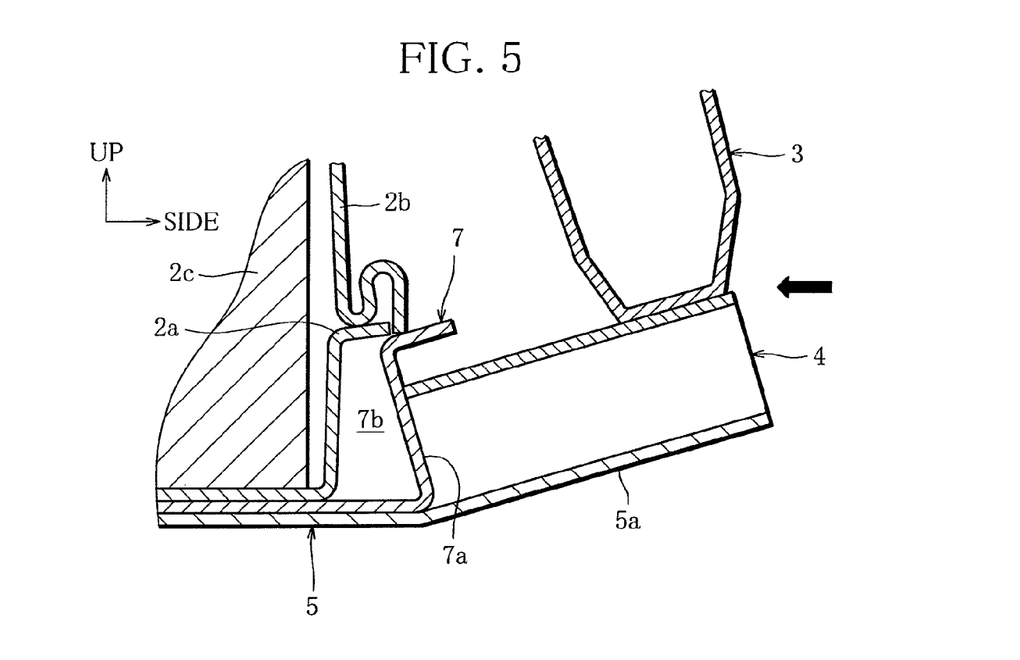
FIG. 5 is an enlarged view of the encircled part B of FIG. 2 in the event of a side impact crash.

FIG. 5 is an enlarged view of the encircled part B of FIG. 2 after a side impact crash. The thick arrow in the drawing shows a load-applied direction in the crash. In the drawing, "UP" and "SIDE" arrows represent the upward and width directions, respectively, of the vehicle body.

As illustrated in FIG. 5, when load is applied to the side member 3 or the battery cross member upper 4 in a crash against the side of the vehicle body 1, the load is transmitted from the battery cross member upper 4 to the front battery cross member lower 5 or the rear battery cross member lower 6 and the battery tray 7. In the first embodiment, the battery cross member upper 4 is not fixed directly to the side wall of the case 2a, and there is space between the battery pack 2 and the battery cross member upper 4. Moreover, the rigidity of the deformable portion 7a of the battery tray 7 is relatively low. For these reasons, in the event of a side impact crash, the deformable portion 7a of the battery tray 7 is deformed toward the deformable zone 7b located nearer the center of the vehicle body 1, to thereby absorb the load produced in the crash.

In this manner, the deformable portion 7a is designed to be deformable in the event of a crash against the side of the vehicle body 1. Because of the deformable zone 7b between the battery cross member upper 4 and the battery pack 2, the deformation of the deformable portion 7a of the battery tray 7 leads to deformation of the battery cross member upper 4 and prevents the load from being applied directly to the battery pack 2. This eases the contact between the battery cross member upper 4 and the battery pack 2, for example, if the battery cross member upper 4 is moved in the inward direction of the vehicle body 1. It is therefore possible to reduce damages to the battery pack 2.

[Second Embodiment]

The battery installation structure for electric vehicles according to a second embodiment of the invention will be described below.

The second embodiment is different from the first in terms of the form of a battery cross member upper 4' and a battery tray 7'. The following description is about matters modified from the first embodiment.

Figure 6:
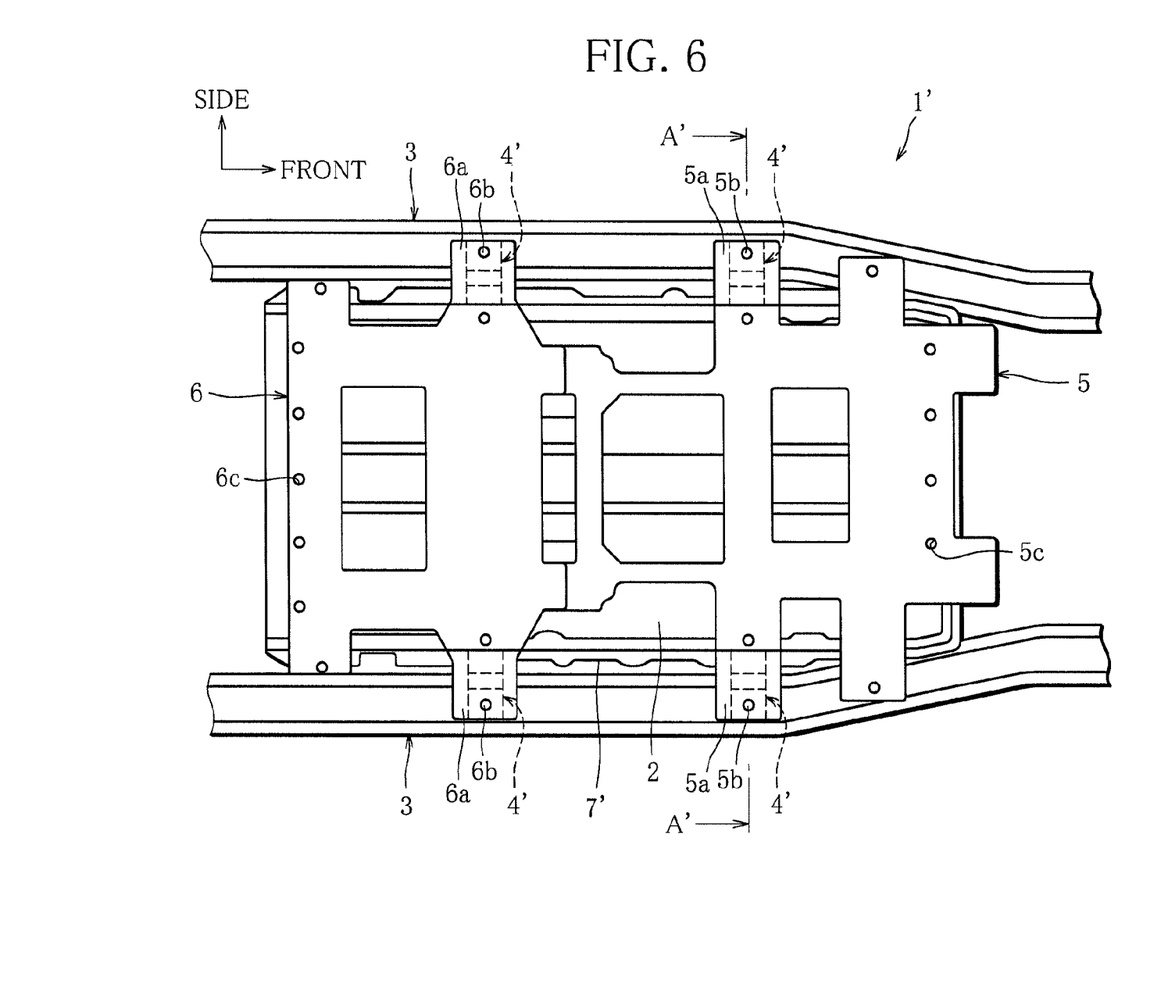
FIG. 6 is a bottom view showing a central part of a vehicle body applied with a battery installation structure for electric vehicles according to a second embodiment of the invention.
Figure 7:
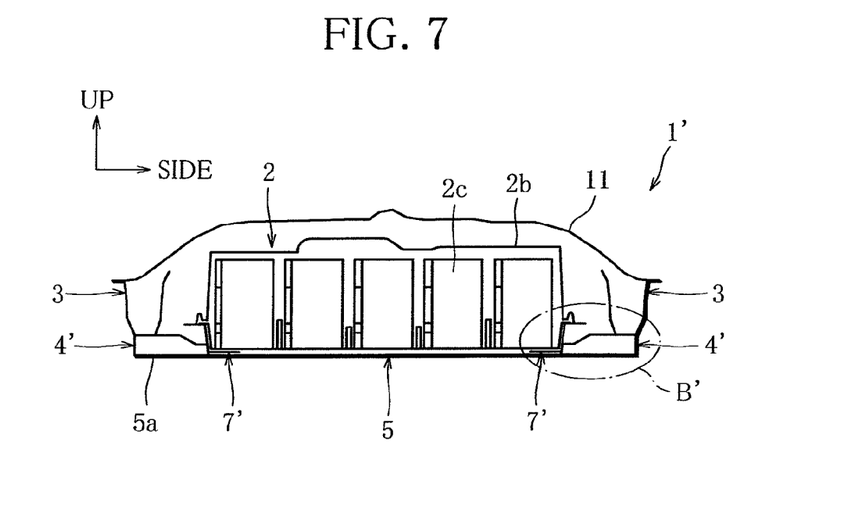
FIG. 7 is a sectional view taken along line of FIG. 6.
Figure 8:
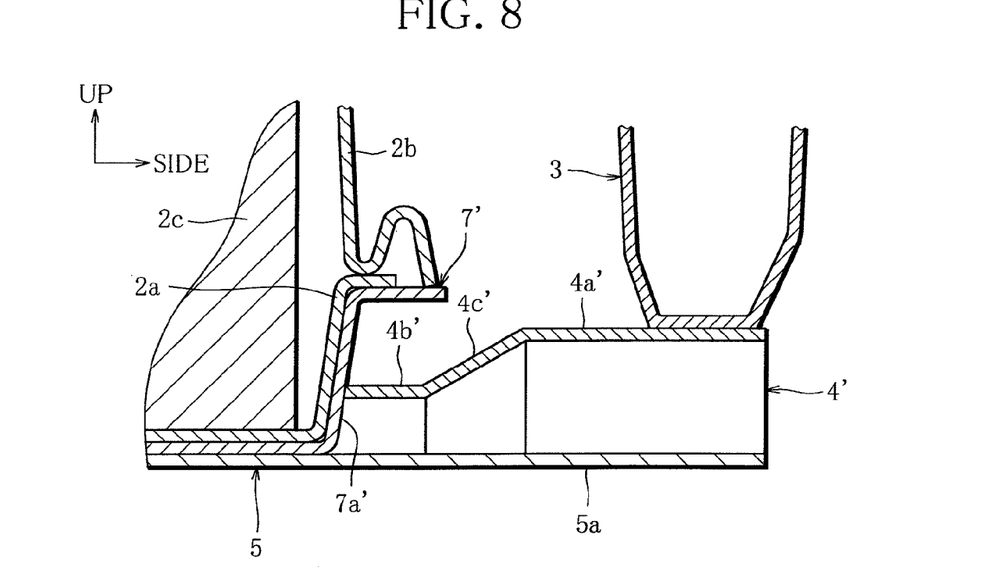
FIG. 8 is an enlarged view of an encircled part B' shown in FIG. 7.

FIG. 6 is a bottom view showing a central part of a vehicle body applied with the battery installation structure for electric vehicles according to the second embodiment of the invention. FIG. 7 is a sectional view taken along line A'-A' of FIG. 6. FIG. 8 is an enlarged view of an encircled part B' shown in FIG. 7. In the drawings, "UP", "FRONT" and "SIDE" arrows represent the upward, forward and width directions, respectively, of the vehicle body.

As illustrated in FIGS. 6 to 8, the battery cross member uppers 4' are each formed into a bar-like shape having an inverted substantially U-shaped section. An attachment portion 4a' is formed in an upper surface of the battery cross member upper 4' to be situated nearer the outside of the vehicle body when the battery cross member upper 4' is attached to the side member 3. A deformable zone 4b', which is lower in height and smaller in cross-sectional area than the attachment portion 4a', is formed in the battery cross member upper 4' to be situated nearer the center of the vehicle body when the battery cross member upper 4' is attached to the side member 3. The attachment portion 4a' and the deformable zone 4b' are connected to each other with a slope 4c' intervening therebetween in the center of the battery cross member upper 4'.

The battery tray 7' is formed in a substantially Z-like shape in section, and is made up of a thin metal plate expanding along the form of the case 2a of the battery pack 2 in a bottom view. In the battery tray 7', there is formed a connecting portion 7a' with which an end of the battery cross member upper 4' comes into contact.

The battery cross member upper 4' is welded to an upper face of the corresponding attachment portion 5a of the front battery cross member lower 5 and an upper face of the corresponding attachment portion 6a of the rear battery cross member lower 6. The end face of the battery cross member upper 4' is welded and fixed to the connecting portion 7a' of the battery tray 7'.

The front battery cross member lower 5 and the rear battery cross member lower 6 are fixed to the side members 3 with bolts, not shown, through the battery cross member uppers 4'.

The battery tray 7' is mounted on the front battery cross member lower 5 and the rear battery cross member lower 6. The battery pack 2 is mounted on the battery tray 7' to be fixed with bolts, not shown.

The following description is about operation and advantages of the battery installation structure for electric vehicles according to the second embodiment of the invention thus configured.

Figure 9:
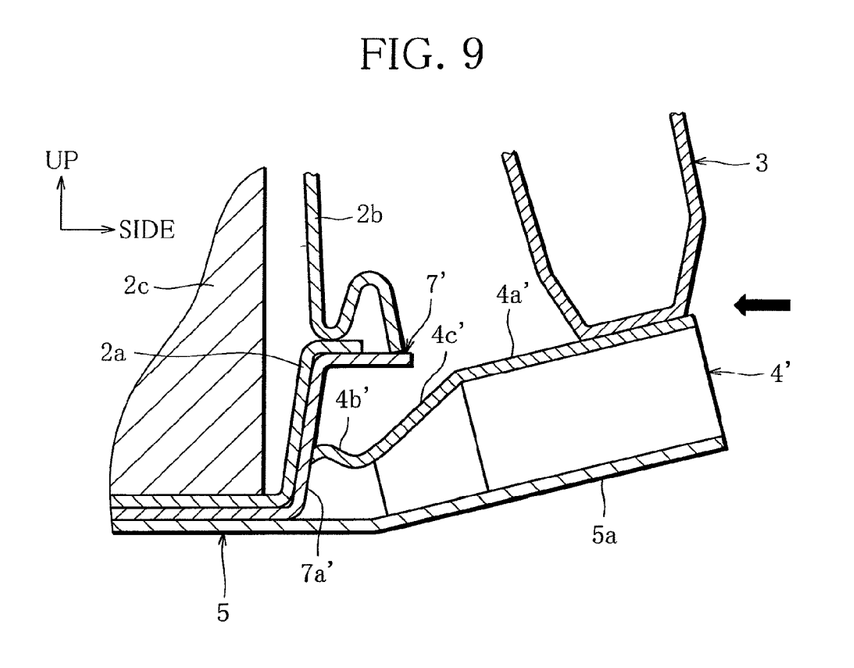
FIG. 9 is an enlarged view of the encircled part B' of FIG. 7 in the event of a side impact crash.

FIG. 9 is an enlarged view of the encircled part B' of FIG. 7 after a side impact crash. The thick arrow in the drawing shows a load-applied direction in the crash. In the drawing, "UP" and "SIDE" arrows represent the upward and width directions, respectively, of the vehicle body.

As illustrated in FIG. 9, because the deformable zone 4b' of the battery cross member upper 4' has smaller sectional area than the attachment portion 4a', when load is applied to the side member 3 or the battery cross member upper 4' in a crash against the side of a vehicle body 1', the battery cross member upper 4' is deformed in the deformable zone 4b' that is small in section in the inward direction of the vehicle body 1' and thus absorbs the load produced in the crash.

Since the battery cross member upper 4' is designed so that deformation occurs in the deformable zone 4b' in the event of a crash against the side of the vehicle body 1', load is not applied directly to the battery pack 2. This softens the contact between the battery cross member upper 4' and the battery pack 2, for example, even if the battery cross member upper 4' is moved in the inward direction of the vehicle body. This makes it possible to reduce damages to the battery pack 2.

This is the end of descriptions of the embodiments of the invention. However, the invention is not limited to the above-described embodiments.

The first embodiment leaves space between the battery cross member upper 4 and the battery pack 2 and uses the space as a deformable zone. The second embodiment reduces the sectional area of the battery cross member upper 4' and uses the portion reduced in sectional area as a deformable zone. This way, the first and second embodiments allow deformation to take place in the deformable zones. Instead of this, a deformable zone may be formed to have lower strength in section than other portions so that deformation occurs in the deformable zone. In this case, the same advantages as in the embodiments can be provided.

What is claimed is:

1. A battery installation structure for electric vehicles, comprising:
    a battery pack located between a pair of side members fixed to both sides of a vehicle body and extending in an anteroposterior direction of the vehicle body, and a plurality of battery cross members extending in a width direction of the vehicle body and fixing the battery pack to the side members, wherein
    the battery pack includes a case and a cover attached to the case,
    the battery cross members include a battery cross member upper having an inverted substantially U-shaped section and a plate-like battery cross member lower that is fixed to a lower face of the battery cross member upper,
    a battery tray that is mounted on the battery cross member lower, the battery pack is placed on the battery tray, and
    the battery cross member lower is connected to the side members through the battery cross member upper so that a deformable zone, defined by the case and the battery tray, permitting deformation of the battery tray is created between the battery cross member upper and the case.

2. The battery installation structure for electric vehicles according to claim 1, wherein:
    the deformable zone is formed so that portions of the battery cross members between the battery pack and each of the side members are lower in strength than portions of the battery cross members fixed to the corresponding side member.

3. A battery installation structure for electric vehicles, comprising:
    a battery pack located between a pair of side members fixed to both sides of a vehicle body and extending in an anteroposterior direction of the vehicle body, and a plurality of battery cross members extending in a width direction of the vehicle body and fixing the battery pack to the side member, wherein
    the battery pack includes a case and a cover attached to the case,
    the battery cross members include a battery cross member upper having an inverted substantially U-shaped section and a plate-like battery cross member lower that is fixed to a lower face of the battery cross member upper,
    a battery tray that is mounted on the battery cross member lower, the battery pack being placed on the battery tray, and
    battery cross member upper portions permitting deformation of the battery cross member upper are formed at a portion of the battery cross member upper between the battery pack and the corresponding side member, and
    the battery cross member upper has a slope formed such that a cross-sectional area of the portion of the battery cross member upper as viewed in the front direction of the vehicle body is reduced with decreasing distances from a center of the vehicle body.

* * * * *